A. W. THOMPSON.
DEVICE FOR TESTING THE TENSION OF BELTS AND THE LIKE.
APPLICATION FILED JAN. 27, 1912.
1,031,208.
Patented July 2, 1912.
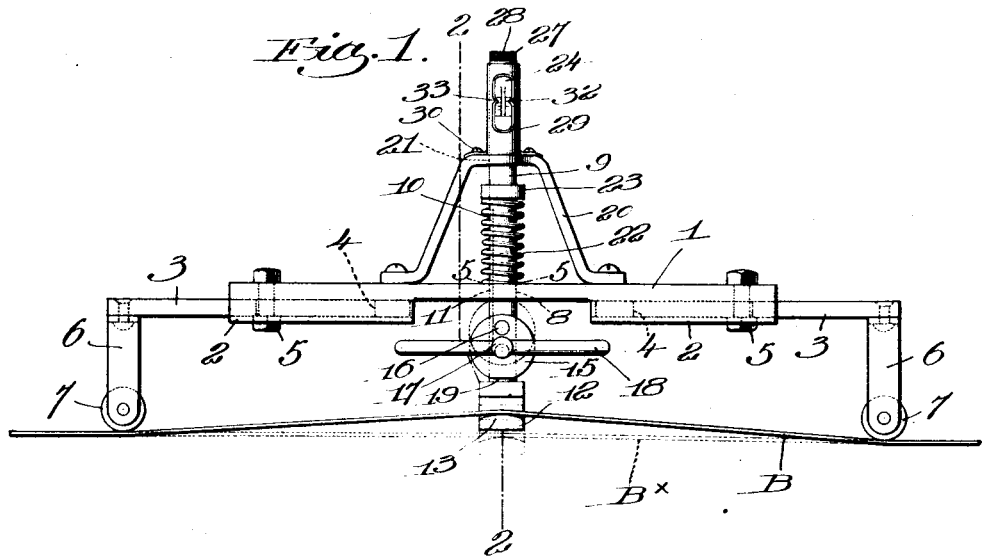

ALBERT W. THOMPSON, OF MANCHESTER, NEW HAMPSHIRE.

DEVICE FOR TESTING THE TENSION OF BELTS AND THE LIKE.

1,031,208.

Specification of Letters Patent.

Patented July 2, 1912.

Application filed January 27, 1912. Serial No. 673,874.

*To all whom it may concern:*

Be it known that I, ALBERT W. THOMPSON, a citizen of the United States, and resident of Manchester, county of Hillsboro, State of New Hampshire, have invented an Improvement in Devices for Testing the Tension of Belts and the Like, of which the following description, in connection with the accompanying drawing, is a specification, like characters on the drawing representing like parts.

This invention has for its object the production of a simple and readily operated device for testing the tension of belts or other flexible driving members of a similar character while the apparatus in which such driving member is included is in an operative condition.

On every belt driven machine there is a clearly defined point beyond which, if the tension of the belt be increased, the friction of the bearings and the wear and tear on the machine will increase excessively, to an extent which will more than offset the added power-transmitting capacity of the belt. There is also an equally clearly defined point below which, if the tension of the belt be allowed to decrease, the belt will slip excessively, so that the machine will lose in productive capacity and will fail to do its work properly. It is therefore important that the tension of the belt be kept between these two points, which will be designated herein as the maximum and minimum tension. Obviously, when a belt is taken up, it should be tightened to the maximum tension, so that as long a time as possible may elapse before the belt will again stretch to the minimum tension and require further attention. To keep all the belts in a large department at a point falling somewhere between the maximum and minimum tensions requires constant vigilance, and a considerable expense for labor and attendance, as well as the use of rather complicated devices for determining exactly the proper tension for a given belt, involving removal of the belt from the machine and testing it on an apparatus specially constructed for the purpose. On the other hand, in the absence of such methods, where the care of belts is left to ordinary attendants, examination shows that very few belts are run between the proper limits of tension. By actual test a large percentage of the belts will prove to be too tight or too loose, so that without scientific care there is both loss of production and excessive wear and tear, not only on the belts themselves but also on the machinery which they drive.

In accordance with my present invention I have provided a tension testing device comprising separated belt-engaging members adapted to impinge upon one face of the belt to be tested, and an intermediate member adapted to impinge upon the other face of the belt, when the latter is in its usual position on the machine with which it coöperates. Spring-induced relative movement of said outer and intermediate members is effected in a direction transverse to the plane of the engaged portion of the belt to be tested, the extent of such spring-induced movement, when the testing device is in use, indicating by means of a suitable gage or scale the variation of the tension of the tested belt from that previously found to be the proper one for imparting the desired efficiency.

Before the test is made the device is set manually so that the impinging surfaces of the several belt-engaging members are substantially in alinement, the actuating spring then being held in a condition of maximum flexure, and the several belt-engaging members are then brought into coöperative relation with the belt, in the manner referred to. The spring is then released and a relative movement of the intermediate and outer belt-engaging members is effected as the spring tends to return to its normal condition, the extent of such relative movement increasing the more the tension of the belt is below what it should be, and being indicated by the gage or scale with which the testing device is provided. From such indication the operator sees at a glance the tension condition of the belt under test and is enabled to make whatever change is needed to restore the belt to its efficient or predetermined tension.

The various novel features of my invention will be fully described in the subjoined specification and particularly pointed out in the following claims.

Figure 1 is a side elevation of a belt tension testing device embodying one practical form of my invention, the device being shown in operative position with relation to the belt the tension whereof is to be tested; Fig. 2 is an end elevation and part transverse section of the testing device, taken on the line 2—2, Fig. 1, looking toward the right; Fig. 3 is an enlarged front elevation of the part of the testing device provided with the indicating gage; Fig. 4 is a partial vertical section thereof, also enlarged, on the line 4—4, of Fig. 3; Fig. 5 is a horizontal sectional detail on the line 5—5, Fig. 1, to be referred to.

Referring to Fig. 1 the operative parts of the device are mounted on an elongated, rigid base 1, which is preferably a flat, rigid metal bar, having on its under side at each end longitudinal guideways 2 for the reception of extension bars 3, slotted longitudinally at 4, (see dotted lines Fig. 1) for the reception of clamping bolts 5. By loosening said bolts the extensions can be moved inward or outward in the guideways, to thereby vary the effective length of the base, for a purpose to be described. Each extension 3 has fixedly attached to it a depending yoke 6 which carries preferably a roll 7 transverse to the length of the base, the said rolls constituting outer belt-engaging members, adapted to impinge upon the outer face of the belt to be tested.

In Fig. 1 a portion of a belt to be tested is indicated at B, the part shown being supposed to be one of the runs of the belt in its usual position on the machine with which it is associated, and while for convenience of illustration the run of the belt is substantially horizontal it is to be understood that the particular position of the belt is of no moment. The base 1 has a central hole or bearing 8 through which a slide rod 9 is movable longitudinally, said slide rod having a longitudinal groove 10 which is entered by a lug 11 on the base, Fig. 5, to thereby prevent any rotative movement of the rod. At its lower end said rod has rigidly secured to it a transverse foot 12, made somewhat like a flattened hook, as shown best in Fig. 2, and parallel to the members 7, the bottom of the foot being preferably convexed upon its upper face, as at 13, this foot constituting the intermediate belt-engaging member of the device. When the testing device is applied to a belt the outer members 7, 7 are brought against the outer face of the belt and the intermediate member 12 is brought against its inner face, the convexed engaging surfaces of such members preventing any injury to the belt and obviating friction, the belt at such time being inserted in the slot-like opening 14, Fig. 2, of the foot. Between the foot and the base 1 two like disks 15 are pivoted eccentrically on the slide rod 9, at opposite sides thereof, by means of a pivot shaft 16, loose in the rod and fixedly attached to the disks. One of the disks has extended centrally therefrom a stud 17 having an attached handle 18, by means of which the shown in Fig. 1, a small portion of the periphery of the disks is flattened, at 19. A bracket 20 is rigidly secured to the top of the base 1 and provides a bearing at 21 for the upper end of the slide-rod 9, the latter being moved upward by the expansive action of a strong spring 22 coiled about the rod between the base and a collar 23 fast on the rod between its bearings 8 and 21. Normally the spring acts to draw the disks 15 toward the inner or under side of the base, and by turning said disks through 180° their eccentric connection with the slide-rod 9 and coöperation with the base, as shown by dotted lines, Fig. 1, will effect longitudinal movement of the rod to flex or compress the spring 22. Full compression is effected when the flattened portions or faces 19 of the disks bear against the base 1, and the device is then set, the spring being locked in a position of maximum flexure or compression by coöperation of the locking faces 19 with the inner surface of the base. At such time the convex surfaces of the members 7, 7 and 12 are so nearly in alinement that the members 7 may be passed over, and the intermediate member 12 under, the belt to be tested, the latter being indicated by dotted lines B$^x$ in Fig. 1 as ready for testing. If the spring 22 is now released by turning the handle of the eccentric disks or setting members 15 the spring will immediately expand and tend to resume its normal condition, and the relative movement of the belt-engaging members thereby induced will deflect the belt, as shown by full lines in Fig. 1, until the spring and the belt are in equilibrium. That is, until the resistance offered by the belt stops any further spring-induced movement of the slide-rod.

The extent of the relative movement of the belt-impinging members, and the deflection of the belt, when equilibrium is established between the stress of the spring and the resistance of the belt, will depend partly upon the width, thickness and length of the belt, but the tension of the belt is the most important factor. Obviously, the slacker the belt the greater will be the deflection, and conversely, the tighter the belt the smaller will be the deflection, so that the amount of deflection is substantially in inverse ratio to the tension of the belt. Now, in any group of machines where the units of a group are practically alike, and where the belts for driving such units are, within narrow limits, of the same length, the same width and thickness, and of like material, it will be obvious that all the governing conditions or factors practically are uniform except the belt tension. Consequently it will be clear that if a proper system of reference marks or indices are made on a page for indicating the belt deflection, (based on a test of one of the before-mentioned belts on a special machine where the tension is known) the testing device herein described can be taken to a group of machines where the conditions corresponding to the test exist, and by applying such device to any belt of such group its tension may be determined very closely.

The gage forming a part of the testing device will now be described.

Herein the gage is a cylinder 24, made of metal and having at its lower end a threaded stud 25 to screw into a threaded socket 26 in the upper end of the slide-rod 9, as clearly shown in Fig. 4, the opposite end of the cylinder preferably being milled or roughened at 27 and provided with a nick 28 for the reception of a screw-driver, whereby the gage may be firmly attached to the slide-rod, yet enabling said gage to be removed readily and replaced by another graduated differently. The gage moves as a unit with the slide-rod, and is inclosed in a tubular casing 29 fixedly attached to the bracket 20, by screws 30, the casing having an elongated sight opening 31, Figs. 1 and 3, provided on opposite sides with reference pointers 32, 33, which obviously, are fixed with relation to the gage 24. By providing a gage for each group of machines the belts of which are to be inspected it will be evident that to change from one group to another wherein conditions differ all that is necessary is to attach to the testing device the gage graduated in accordance with the conditions present in the latter group. The only graduation required on a gage is one referring to maximum and minimum tensions, but another graduation can be provided which will indicate the amount by which the tested belt must be taken up or shortened in order to bring its actual tension up to the maximum desired tension. Thus, in Fig. 3, the graduations adjacent the pointer 32 indicate tension in pounds, and the graduations adjacent pointer 33 indicate in quarters of an inch the amount to be taken up to bring the tension up to the desired maximum. Proper data will be cut on the gage to explain the sets of graduations, and preferably other data will be provided relating to the particular group of machines to which a given gage applies, with the dimensions of the belts.

Referring to Fig. 3, the maximum tension is indicated by the number 80 at the top of the right hand graduations, and the minimum tension by the number 40, at the bottom of such graduations, and the graduation between these two indicates a tension below which the belt should be taken up to maximum. If the pointer 32 is between the two upper marks the tested belt will not be changed. In Figs. 1 and 3 the pointer is just opposite the intermediate graduation, indicating that belt B should be taken up to bring it to maximum, and by referring to the left hand series of graduations the pointer 33 indicates that to effect the increased tension the belt should be shortened nearly one-quarter of an inch.

With the testing device an inspector applies it to the belt of one machine after another in a group, and determines thereby, first, whether the belt is sufficiently below the maximum tension to require taking up, and, second, if it is to be taken up how much should be taken out of the belt to bring the tension thereof up to the desired point.

It is to be distinctly understood that the testing device is not universal. In other words, if the gage is graduated to correspond to a 2 inch belt 20'–0" long, and the testing device is applied to a 3 inch belt of the same length or to a belt of the same width but materially shorter or longer than 20 feet, the reading of the device will be misleading. The device is sufficiently accurate, however, to cover reasonable variations. For instance, the difference in the gage readings for a 2 inch belt 18'–0" long and one of the same width 20'–0" long would be scarcely appreciable, so that one gage can always be used throughout an entire room wherein the conditions of the driving belts on the different machines are substantially the same.

By making the outer belt-engaging members 7 adjustable as to the distance between them the range of the testing device is increased. By increasing the distance between said members the deflection of the belt produced by the action of the spring will be increased, and conversely, by decreasing the distance between said outer members the belt deflection induced by expansion of the spring will be diminished. The adjustment of such outer members, by reference to a properly prepared scale, would then enable the device to be used on belts of different lengths without change of the gage, but for different widths of belt the gage would have to be changed to accord therewith.

While I have herein shown the testing device as arranged for testing flat belts it will be obvious that the device could readily be used for testing the tension of rope, cable or other flexible driving members, and various changes or modifications in details of construction and arrangement may be made by those skilled in the art without departing from the spirit and scope of my invention as set forth in the annexed claims.

Having fully described my invention, what I claim as new and desire to secure by Letters Patent is:

1. In a device of the class described, two members spaced apart a predetermined distance and adapted to impinge upon one face of a belt to be tested, an intermediate member to impinge upon the opposite face of the belt, a spring to effect relative movement of said intermediate and outer members in a direction transverse to the plane of the belt to thereby deflect the belt to an extent substantially in inverse ratio to its tension, and a gage to indicate the extent of such deflection.

2. In a device of the class described, two members spaced apart a predetermined distance and adapted to impinge upon one face of a belt to be tested, an intermediate member to impinge upon the opposite face of the belt, a spring to effect relative movement of said intermediate and outer members in a direction transverse to the plane of the belt, to thereby deflect the belt between the outer members to an extent substantially in inverse ratio to its tension, and a gage governed by the relative movement of the belt-impinging members, to indicate the extent of belt deflection with relation to a predetermined maximum and minimum tension.

3. In a device of the class described, two members spaced apart a predetermined distance and adapted to impinge upon one face of a belt to be tested, an intermediate member to impinge upon the opposite face of the belt, a spring to effect relative movement of said intermediate and outer members in a direction transverse to the plane of the belt, to thereby deflect the belt to an extent substantially in inverse ratio to its tension, and a gage to indicate the extent of such deflection, combined with manually operated means to flex the spring and thereby bring the outer and intermediate members in substantial alinement, in position to be applied to opposite faces of the belt to be tested.

4. In a device of the class described, two members spaced apart a predetermined distance and adapted to impinge upon one face of a belt to be tested, an intermediate member to impinge upon the opposite face of the belt, a spring to effect relative movement of said intermediate and outer members in a direction transverse to the plane of the belt, to thereby deflect the belt to an extent substantially in inverse ratio to its tension, and a gage to indicate the extent of such deflection, combined with manually operated means to flex the spring and lock the belt-impinging members in substantial alinement in position to be applied to opposite faces of the belt, release of the spring by said means permitting relative spring-induced movement of the outer and intermediate belt-impinging members to deflect the belt.

5. In a device of the class described, two members spaced apart a predetermined distance and adapted to impinge upon one face of a belt to be tested, an intermediate member to impinge upon the opposite face of the belt, a spring to effect relative movement of said intermediate and outer members in a direction transverse to the plane of the belt, to thereby deflect the belt to an extent substantially in inverse ratio to its tension, and a readily detachable gage to indicate the extent of such belt deflection, said gage being graduated for a belt of given dimensions, the substitution of one gage for another enabling the device to be used for testing belts having different dimensions.

6. In a device of the class described, a base, two belt-engaging members mounted thereon at a predetermined distance apart and in parallelism, adapted to impinge upon one face of a belt to be tested, an intermediate member parallel to the other members and adapted to impinge upon the opposite face of the belt, a fixedly attached support for the intermediate member, slidable in the base, a spring coöperating with said support to move the attached member toward the base and thereby deflect the belt engaged by the fixed and movable members, the extent of such deflection being substantially in inverse ratio to the tension of the belt, a gage carried by the slidable support, to indicate the extent of such deflection, and a pointer to coöperate with the gage and fixedly connected with the base.

7. In a device of the class described, a base, two members carried thereby and adjustable thereon toward and from each other and adapted to impinge upon one face of a belt to be tested, an intermediate member having an attached support longitudinally movable in the base, said member being adapted to impinge upon the opposite face of the belt, a spring to move said support and the attached member transversely of the plane of the belt, to deflect the latter to an extent substantially in inverse ratio to its tension, and a gage governed by the spring-induced movement of said member, to indicate the extent of belt deflection with relation to a predetermined maximum and minimum tension.

8. In a device of the class described, an elongated flat base, two belt-engaging members transverse thereto and rigidly connected with the base adjacent its ends, a bracket on the base, co-axial bearings in the bracket and base, a slide-rod movable longitudinally in the bearings at right angles to the plane of the base, a transverse belt-engaging member on said rod between the first-named members, the latter being adapted to impinge upon the outer face of a belt to be tested when the intermediate member impinges upon its inner face, a spring to move the slide-rod and its attached member to deflect the belt, manually operated means to flex the spring and lock it, to thereby position the movable member substantially in alinement with the outer members, for application to the belt, the spring when released moving the intermediate member and deflecting the belt to an extent depending upon its tension, and a gage to indicate the extent of such deflection with relation to a predetermined maximum and minimum tension.

9. In a device of the class described, a rigid base, two bearings mounted thereon at a predetermined distance apart and adapted to impinge upon the outer face of a flexible driving member to be tested, an intermediate bearing adapted to impinge upon the opposite face of the driving member, a support for said intermediate bearing, slidably mounted in the base, a spring coöperating with said support to draw the attached bearing toward the base and thereby deflect the driving member under test, the extent of such deflection increasing with the slackness of the driving member, and a detachable gage governed by spring-induced movement of the said support, to indicate the extent of deflection of the tested member with relation to a predetermined maximum tension.

10. In a device of the class described, a base, two belt-engaging members mounted thereon at a predetermined distance apart and adapted to impinge upon the outer face of a belt to be tested, an intermediate member adapted to impinge upon the inner face of the belt, spring-actuated means to move said member toward the base to thereby deflect the belt between the outer members to an extent substantially in inverse ratio to the tension of the belt, a gage to indicate the extent of such deflection, and manually operated means to set and position the intermediate member for application to the belt and also to unlock and permit spring-induced deflecting movement of such member.

In testimony whereof, I have signed my name to this specification, in the presence of two subscribing witnesses.

ALBERT W. THOMPSON.

Witnesses:
HELEN C. FITZGERALD,
L. ASHTON THORP.